March 9, 1948.   J. R. STEENHOVEN   2,437,656
DUMP ATTACHMENT FOR VEHICLES
Filed Dec. 13, 1946   2 Sheets-Sheet 1

Inventor
John R. Steenhoven

By *Clarence A. O'Brien and Harvey B. Jacobson*
Attorneys

March 9, 1948. J. R. STEENHOVEN 2,437,656
DUMP ATTACHMENT FOR VEHICLES
Filed Dec. 13, 1946 2 Sheets-Sheet 2

Inventor
John R. Steenhoven

By *Clarence A. O'Brien and Harvey B. Jacobson*
Attorneys

Patented Mar. 9, 1948

2,437,656

UNITED STATES PATENT OFFICE 2,437,656

DUMP ATTACHMENT FOR VEHICLES

John R. Steenhoven, Springfield, Minn.

Application December 13, 1946, Serial No. 716,106

2 Claims. (Cl. 298—19)

This invention relates to a dump attachment for a vehicle and has for its primary object to convert a four-wheeled vehicle, such as a farm wagon into a dump truck.

Another object is to utilize the full thrust of a fluid actuated ram in effecting the dumping operation.

The above and other objects may be attained by employing this invention which embodies among its features a main frame adapted to lie upon the bed of a vehicle, a sub-frame adapted to fit within the main frame, a pivotal connection between one end of the main frame and the adjacent end of the sub-frame, a fulcrum shaft carried by the main frame intermediate its ends, said fulcrum shaft extending transversely of the main frame below the underside thereof, a lift lever pivoted intermediate its ends to the fulcrum shaft adjacent each side of the main frame, a roller adjacent the end of each lift lever for engagement with the sub-frame near its free end, a transversely extending pivot bar fixed to the sub-frame near its pivoted end, said pivot bar lying intermediate the ends and above the plane of the upper side of the sub-frame, a fluid actuated ram adjacent each side of the sub-frame, one end of each ram being pivotally connected to the pivot bar and the opposite end of each ram being pivotally connected to the end of a lift lever remote from the end carrying the roller whereby when the ram is energized a lifting force will be exerted adjacent each end of the lift frame.

Figure 1:
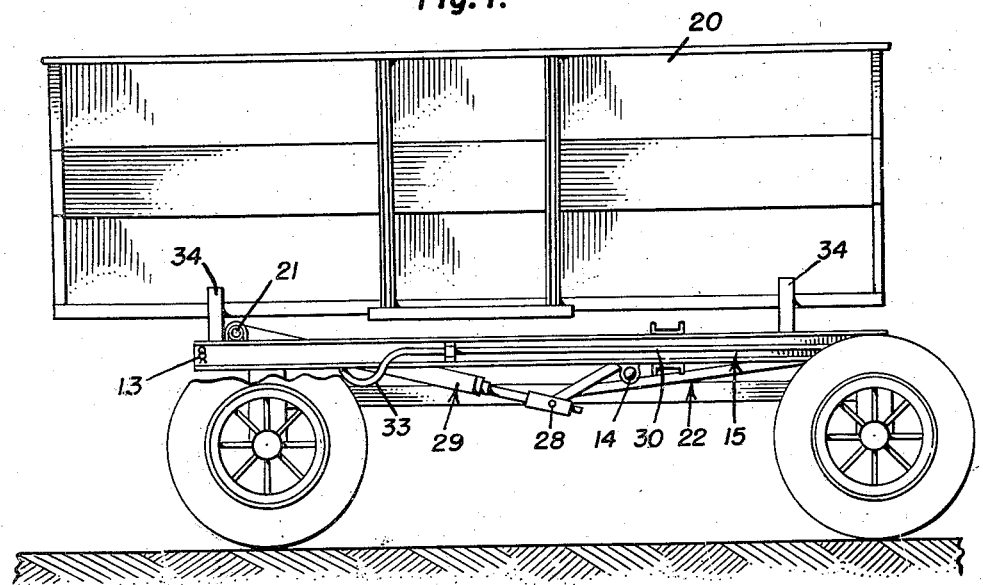
Figure 1 is a side view of a vehicle equipped with this improved dump attachment.

Referring to the drawings in detail, a main frame designated generally 10 is constructed of spaced parallel side bars 11 joined at one end by an end bar 12. The side bars 11 and end bars 12 are preferably formed from channel iron with the flanges directed outwardly, and extending between the ends of the side bars 11 opposite end bar 12 is a pivot bar 13. Extending transversely between the side bars 11 intermediate their ends and below the under side of the frame 10 is a fulcrum bar 14 the purpose of which will be more fully hereinafter explained.

Figure 3:
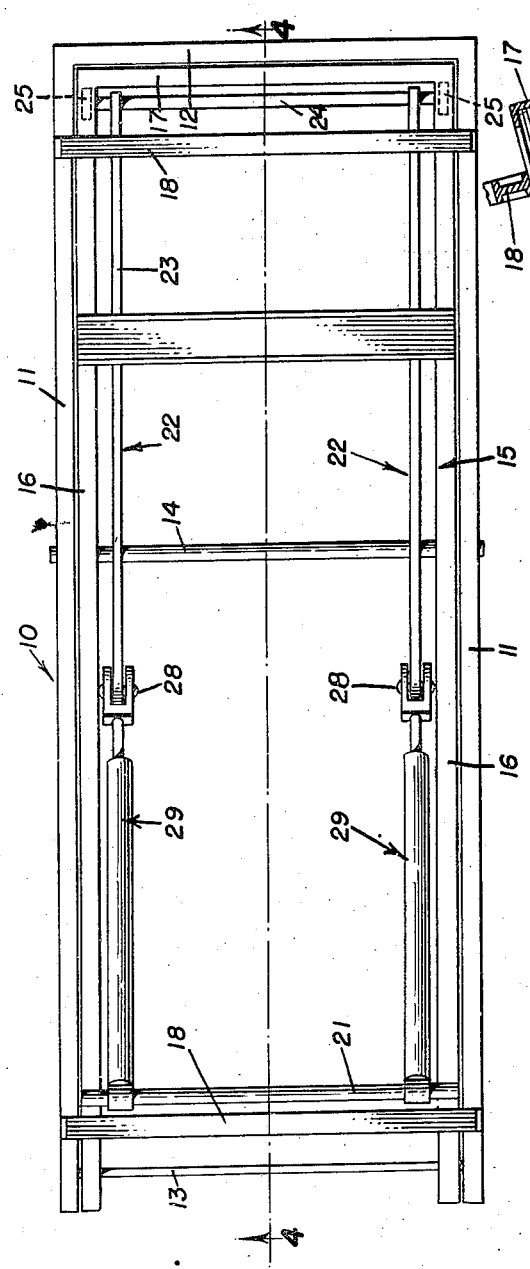
Figure 3 is a plan view of the attachment.

Pivotally supported on the pivot shaft 13 is a sub-frame designated generally 15 which like the main frame 10 is formed of side bars 16 joined at one end by an end bar 17 which when the sub-frame is in lowered position lies parallel with and near the end bar 12, while the side bars 16 lie parallel with and near the side bars 11 of the main frame 10. The ends of the side bars 16 opposite those joined by the end bar 17 are pivotally supported on the pivot shaft 13 and as illustrated in Figure 3 the sub-frame 15 when lowered lies wholly within the main frame 10. Attached to each side bar 16 adjacent opposite ends thereof is a transversely extending bolster 18 the upper face of each of which lies in a plane above the plane of the frame 15 and forms a rest upon which the body 20 of the wagon is sustained. Each bolster 18 extends somewhat beyond the outermost edge of each side of the sub-frame 15 so that when the sub-frame is in lowered position the bolsters will rest on the top faces of the side rails 11 of the frame 10. Extending transversely of the sub-frame 15 and spaced inwardly a short distance from the pivot shaft 13 is a pivot bar 21 the purpose of which will be more fully hereinafter explained.

Figure 2:
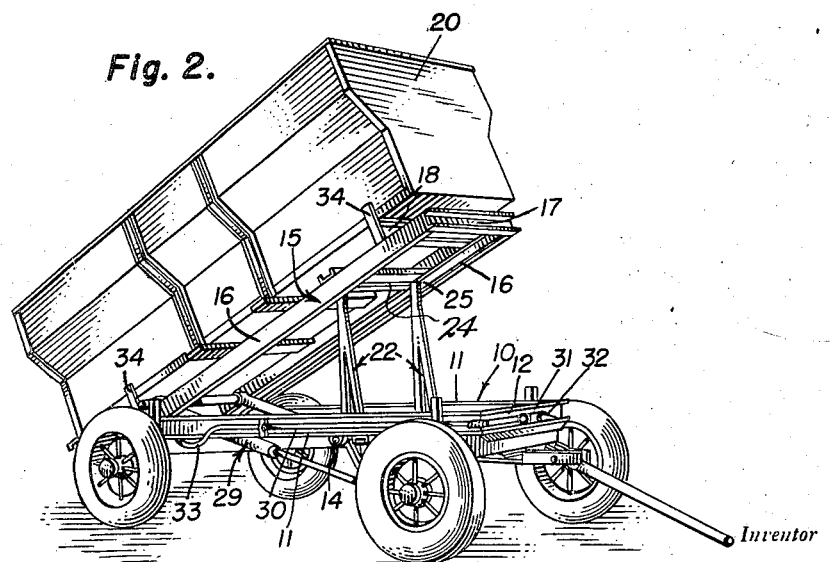
Figure 2 is a perspective view illustrating the body of the vehicle elevated into dumping position.
Figure 4:
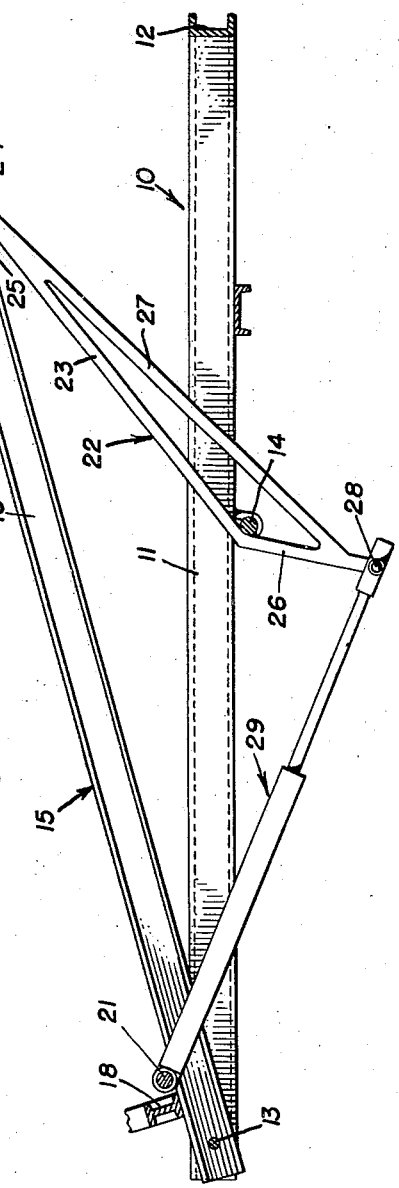
Figure 4 is a longitudinal sectional view taken substantially along the line 4—4 illustrating the lift frame partially elevated.

Pivotally mounted intermediate its ends on the fulcrum bar 14 adjacent each side bar 16 of the frame 15 is a lift lever designated generally 22, each of which comprises a lift arm 23 the free end of which when the frame 15 is in lowered position lies near the end bar 17 thereof. Rotatably supported as at 24 adjacent the free end of the lift arm 23 above referred to is a lift roller 25 which is adapted to ride between the flanges of its respective side bar 16 so that when the lift arm is elevated as illustrated in Figures 2 and 4 the frame 15 will be moved upwardly about its pivot shaft 13. Extending angularly from the lift arm 23 adjacent the pivotal mounting of the lift lever 22 on the fulcrum bar 14 is an operating lever 26, and a reinforcing bar extends from a point near the free end of the operating lever 26 to the free end of the lift arm 23.

Pivotally connected at 28 to the end of each operating lever 26 is one end of a fluid actuated ram designated generally 29, the opposite end of which is pivotally supported on the pivot bar 21, so that when fluid pressure is admitted to the ram, the operating lever 26 will be moved about the fulcrum bar 14 to move its respective lift arm 23 and thus impart a lifting motion on the sub-frame 15. Simultaneously with the thrust of the ram on the pivot point 28 of the operating lever 26, an upward thrust is developed against the pivot bar 21 so that a lifting action is exerted on the frame 15 adjacent its pivot 13.

In order to supply fluid to the ram 29 a fluid supply pipe 30 extends along one side of the main frame 10 and to a point substantially mid-way between opposite ends of the end bar 12 thereof at which point it terminates in a valve 31 equipped with a suitable fitting 32 (Figure 2) by which fluid under pressure may be admitted to the pipe 30. Suitable flexible couplings 33 are connected to the end of the pipe 30 opposite the valve 31 and to the respective cylinders of the arms 29.

In use it will be understood that the main frame 10 is mounted on the wagon bed as suggested in Figures 1 and 2 and the wagon body 20 is then placed on the frames so that it rests upon the bolsters 18 and between suitable end stops 34 carried by opposite ends of the bolsters. When the body is in lowered position as illustrated in Figure 1, the weight thereof and of its contents will be transmitted to main frame 10 through the medium of the extensions on the bolsters. When it is desired to dump the contents of the body 20 fluid pressure is admitted to the rams 29, thus causing the lift levers 22 to swing about the fulcrum bar 14 as illustrated in Figures 2 and 4 to cause the lift rollers 25 to engage the uppermost flanges of the side bars 16 of the sub-frame 15 and thus move the free end of said sub-frame upwardly about the pivot shaft 14. Due to the fact that the ends of the rams 29 opposite those which are connected to the lift levers 22 are pivotally connected to the sub-frame 15 intermediate the pivot shaft and the free end thereof it will be obvious that the thrust of the ends of the rams will be exerted in such a manner as to be translated into a lifting action against the sub-frame. In this way a maximum lifting effort will be exerted on the frame to move it about the pivot shaft 13 of the main frame 10.

While in the foregoing there has been shown and described the preferred embodiment of this invention it is to be understood that minor changes in the details of construction, combination and arrangement of parts may be resorted to without departing from the spirit and scope of the invention as claimed.

What I claim is:

1. A dump attachment for a four wheeled vehicle which includes a main frame adapted to lie upon the bed of a vehicle, a sub-frame adapted to fit within the main frame, a pivotal connection between the one end of the main frame and the adjacent end of the sub-frame, a fulcrum shaft carried by the main frame intermediate its ends, said fulcrum shaft extending transversely of the main frame below the under side thereof, a lift lever pivoted intermediate its ends to the fulcrum shaft adjacent each side of the main frame, a roller adjacent the end of each lift lever for engagement with the sub-frame near its free end, a transversely extending pivot bar fixed to the sub-frame near its pivoted end, said pivot bar lying intermediate the ends and in a plane above the upper side of the sub-frame, a fluid actuated ram adjacent each side of the sub-frame, one end of each ram being pivotally connected to the pivot bar and the opposite end of each ram being pivotally connected to the end of a lift lever remote from the end carrying the roller whereby when the ram is energized a lifting force will be exerted adjacent each end of the lift frame.

2. A dump attachment for a four wheeled vehicle which includes a main frame adapted to lie upon the bed of a vehicle, a sub-frame adapted to fit within the main frame, a pivotal connection between the one end of the main frame and the adjacent end of the sub-frame, a fulcrum shaft carried by the main frame intermediate its ends, said fulcrum shaft extending transversely of the main frame below the under side thereof, a lift lever pivoted intermediate its ends to the fulcrum shaft adjacent each side of the main frame, a roller adjacent the end of each lift lever for engagement with the sub-frame near its free end, a transversely extending pivot bar fixed to the sub-frame near its pivoted end, said pivot bar lying intermediate the ends and in a plane above the upper side of the sub-frame, a fluid actuated ram adjacent each side of the sub-frame, one end of each ram being pivotally connected to the pivot bar and the opposite end of each ram being pivotally connected to the end of a lift lever remote from the end carrying the roller whereby when the ram is energized a lifting force will be exerted adjacent each end of the lift frame, a body bolster adjacent each end of the lift frame and adapted when the lift frame is lowered to engage and rest on the main frame.

JOHN R. STEENHOVEN.